United States Patent [19]
Iff

[11] 3,913,425
[45] Oct. 21, 1975

[54] WIRE STRIPPER

[76] Inventor: Fritz Iff, Schauenbergstrasse 26, Zurich, Switzerland

[22] Filed: May 21, 1974

[21] Appl. No.: 471,887

[30] Foreign Application Priority Data
July 3, 1973 Switzerland.......................... 9691/73

[52] U.S. Cl................................................ 81/9.5 A
[51] Int. Cl.² ........................................ H02G 1/12
[58] Field of Search............... 81/9.5 A, 9.5 R, 9.51

[56] References Cited
UNITED STATES PATENTS

| | | | |
|---|---|---|---|
| 3,176,550 | 4/1965 | Marcotte | 81/9.51 |
| 3,563,117 | 2/1971 | Bolssens | 81/9.5 A |
| 3,596,541 | 8/1971 | Bieganski | 81/9.5 A |

FOREIGN PATENTS OR APPLICATIONS

| | | | |
|---|---|---|---|
| 619,302 | 9/1935 | Germany | 81/9.5 A |
| 1,300,465 | 7/1969 | Germany | 81/9.5 R |

*Primary Examiner*—Al Lawrence Smith
*Assistant Examiner*—Roscoe V. Parker
*Attorney, Agent, or Firm*—Roylance, Abrams, Berdo & Kaul

[57] ABSTRACT

A wire stripper includes; a first pair of frames carrying a first pair of jaws for constraining a wire, on corresponding ends thereof, a second pair of frames, carrying on corresponding ends thereof, a second pair of jaws for notching the insulation of the wire, a severing device for severing the end of the wire and means for increasing the spacing between the jaws of the first pair and the jaws of the second pair during closure thereof so that the notched portion of the insulation is drawn towards the end of the wire. Single-handled, double-handled and pistol grip operating devices are described.

13 Claims, 14 Drawing Figures

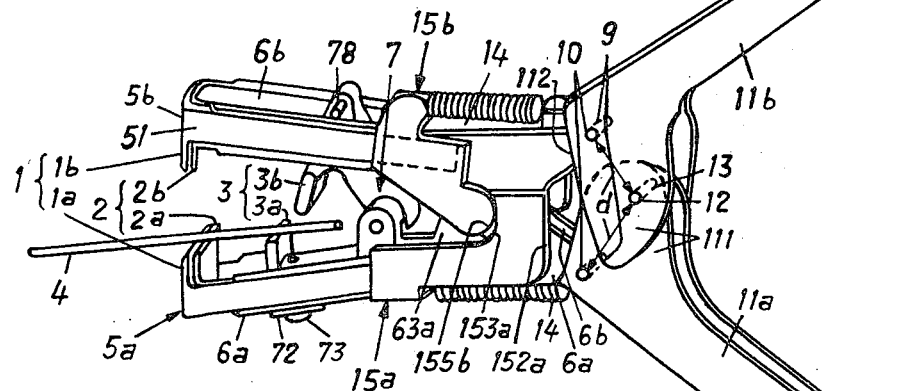
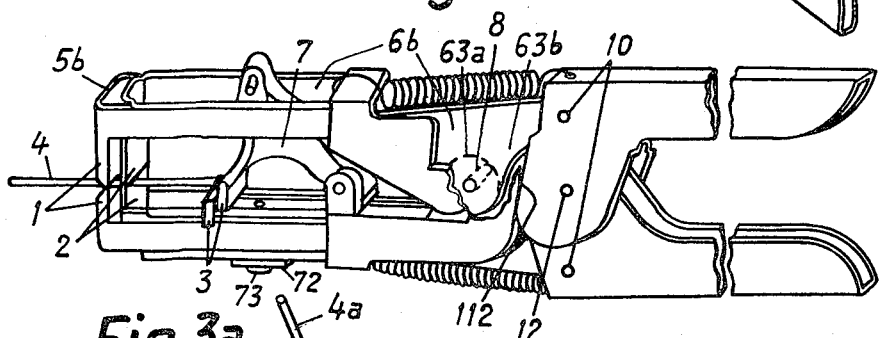
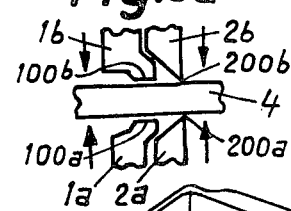
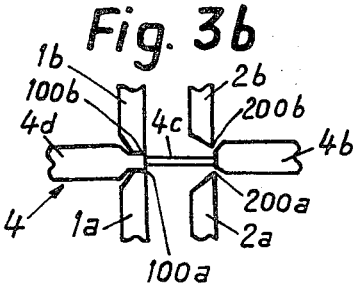
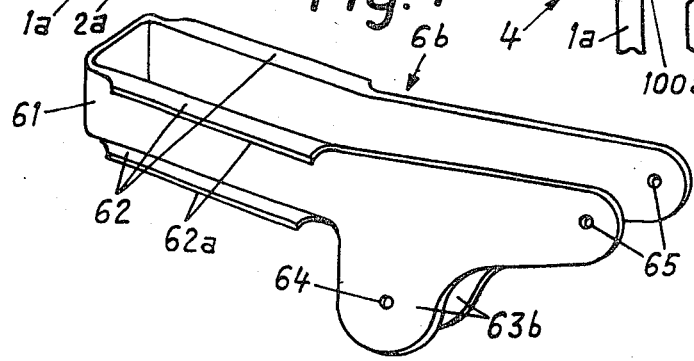

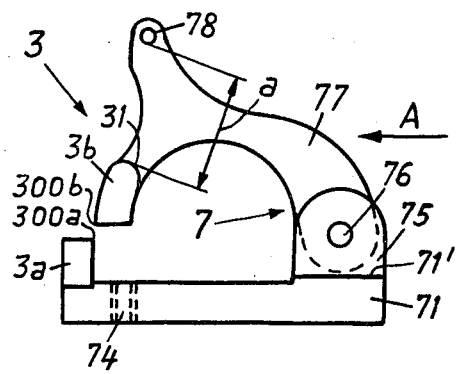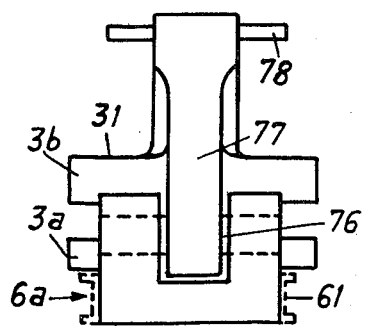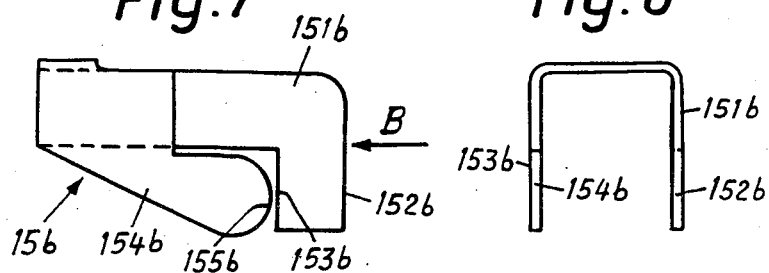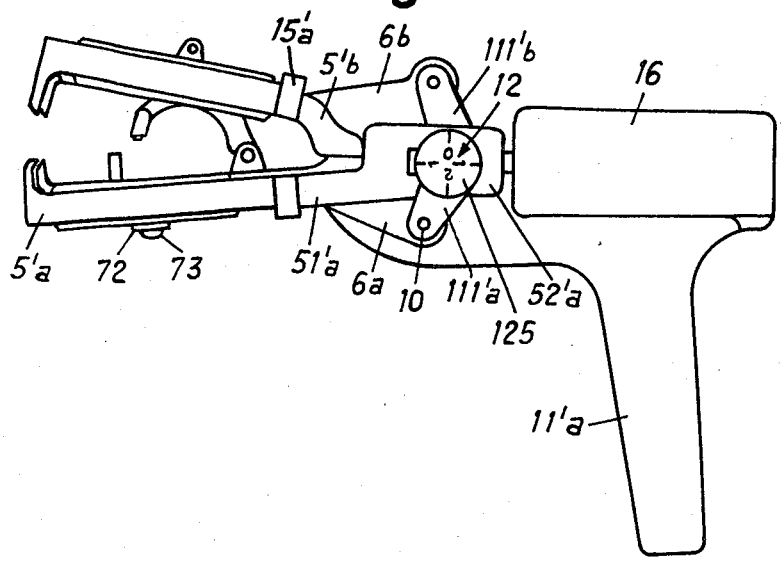

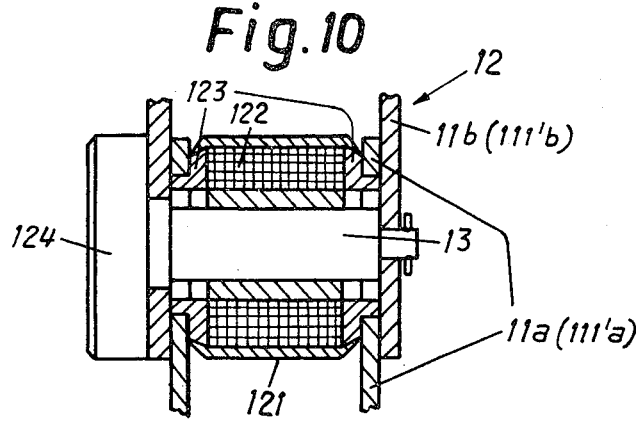
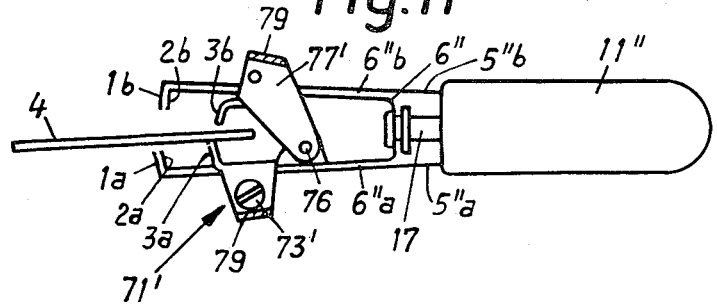
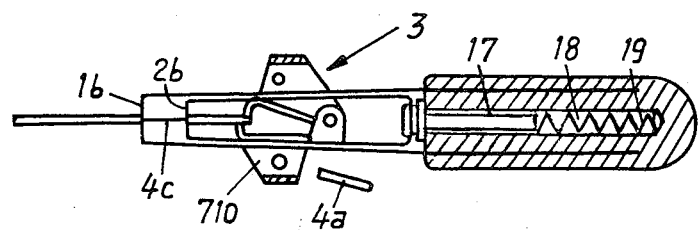
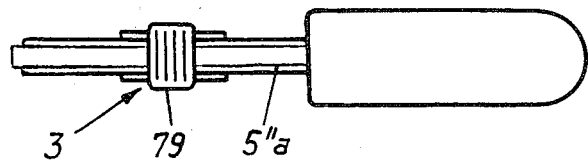

WIRE STRIPPER

The present invention relates to wire strippers.

Electrically connecting wire is frequently provided with an insulating layer of plastics or like material and it is necessary to remove this insulation from the ends of the wire to permit electrical connection to the conducting portion of the wire.

According to the present invention there is provided a wire stripper including a first pair of frames having ends movable towards one another, a first pair of jaws mounted on corresponding ends thereof for constraining an insulated wire therebetween, a second pair of frames having ends movable towards and away from one another; a second pair of jaws mounted on corresponding ends thereof for making notches in the insulation of the wire; a severing device for severing the end of the wire, the second pair of jaws being located between the first pair of jaws and the severing device and the spacing of the severing device from the second pair of jaws being adjustable, and means for increasing the spacing between the jaws of the first pair and jaws of the second pair of the two pairs of jaws during closure.

In a first embodiment of the invention each of the pairs of frames consist of two longitudinally extending spaced apart side plates and a transverse portion therebetween which carries a respective jaw and each of the first pair of frames is slidably mounted on a respective one of the second pair of frames.

Preferably, the second pair of frames are pivotably mounted with respect to one another at a location between their ends and each of the end portions of these frames remote from the jaws are pivotally connected to a respective operating component, the operating components in turn being pivotally mounted with respect to one another about a common shaft having a resilient radially peripheral portion. Preferably the severing device consists of a first jaw mounted on a plate which engages one of the second pair of frames without obstructing the movement of the corresponding first frame, and a second jaw pivotally connected to the first severing jaw mounting plate at a location between the second pair of frames, the severing device having transversely extending portions which are entrained by the second pair of frames so that movement of the second frames towards one another causes movement of the severing device jaws towards one another.

The operating components may be in the form of handles.

In a second preferred embodiment of the invention the construction is similar to that of the first embodiment except that a piston grip which has a piston and cylinder arrangement, is provided in place of the handles, the piston of which acts directly on the resilient shaft to displace it in a longitudinal direction.

In a third embodiment of the invention both pairs of frames are of resilient construction and the ends of the first pair of frames remote from the jaws are anchored to a handle. The second pair of frames are located between the first pair of frames, carry the severing device and are rigidly secured to a pin which is axially displacable in a bore in the handle and the second pair of frames and a severing device are adapted for longitudinal movement relative to the first pair of frames. Suitably, the severing device includes two cutters each secured to a respective holder portion, the two holder portions being relatively pivotable with respect to one another. One of these holder portions is adjustably mounted on one of the second pair of frames and the other portion is adapted to entrain the other frame of the second pair of frames, the two portions being shaped so that they do not contact the first pair of frames so that during closure of the severing cutters the second pair of frames also close.

The invention thus provides various forms of wire stripper which facilitate quick and easy stripping of the insulation from the end of a length of wire. The first two embodiments described are suitable for larger gauge wires whilst the third embodiment is especially useful or stripping the very fine wires encountered in the electronics industry.

In all the embodiments described the first pair of jaw constrains the wire whilst the second pair of jaws notches the insulation and during operation of the strippers slides this insulation towards the end of the wire. The severing device in co-operation with the second pair of jaws determine the amount of the insulation removed and by adjusting the position of the severing device relative to the second pair of jaws, this amount may be varied as desired.

In order that the invention be more clearly understood the following description is given, merely by way of example, reference being made to the accompanying drawings in which:

FIG. 1 shows a view in perspective of a first embodiment of wire stripper in accordance with the present invention, in its unactuated state, FIG. 2 shows a similar view during during actuation, some parts being partially broken away, FIG. 3 shows the two pairs of notching jaws viewed from the side, at the beginning of the stripping process, FIG. 4 is a view in perspective of an inner frame, FIG. 5 is a side view of the severing device, FIG. 6 is a view in the direction of arrow A of FIG. 5, FIG. 7 is a side view of a slider, FIG. 8 is a view in the direction of arrow B of FIG. 6, FIG. 9 is a side view of a second embodiment of wire stripper in accordance with the invention adapted to be hydraulically or pneumatically actuated, FIG. 10 shows a section through the junction of the two handles of FIG. 1, FIG. 11 shows a third embodiment of wire stripper in the form of pincers for removing insulation, in not actuated state.

FIG. 12 shows the same view as FIG. 11, after the insulation has been stripped from the conductor, and FIG. 13 is a plan view of this embodiment.

The stripping tool has two pairs of jaws 1a, 1b and 2a, 2b as well as a severing device 3 having two cutters 3a, 3b. The pair of jaws 1a, 1b serves to constrain at least one insulated electric conductor 4 introduced between the pairs of jaws 1, 2 and knives 3; the jaws 1 thereby squeeze the insulation of the conductor. The pair of jaws 2 serves to form a notch in the squeezed insulation and the cutters 3a, 3b are intented for severing the end portion 4a which exceeds the length of the conductor core 4c to be bared of insulation.

Each jaw 1a, 1b of the pair of jaws 1 is fitted to the end of a first frame 5a, 5b and juts out vertically from the latter. Furthermore, each of these jaws is provided with a squeezing edge 100a, 100b (FIG. 3a, 3b). The two frames 5a, 5b have identical side walls 51. These side walls are displaceably mounted, in pairs, to a respective inner frame 6a, 6b. The two respective longitudinal sides of the side walls 61 of these two frames are slightly flanged or in some other suitable manner formed as a U-section having short legs, so that these legs provide a guide means for the side walls 51 and thus for the frames 5a, 5b. The two frames 6a, 6b carry, in the same manner as the frames 5a, 5b, at their ends a respective one of the already mentioned constraining jaws 2a, 2b provided with notching or scoring edges 200a, 200b (FIGS. 3a, 3b). As is apparent from FIGS. 1 and 3a, when the tool is not being actuated these edges are situated directly adjacent the edges 100a, 100b of the pair of jaws 1.

The two frames 6a, 6b are furthermore carriers of the severing device 3. The latter carries the cutters 3a, 3b on a two-part holder 7. The cutter 3a, in the form of a platelet having a sharp cutting edge 300a (FIG. 5) is rigidly secured to a guide body 71 of the holder 7, which guide body is releasably mounted between the side walls 61 of the inner frame 6a.

The guide body 71 is secured against dropping out, inwardly of the frame 6a by the cutter 3a being wider than the spacing of the two side walls 61, for the same purpose there is provided, outwardly of the frame 6a, a clamping platelet 72 (FIG. 1, 2) which is also wider than the separation of the two side walls 61. A set screw 73 threadedly engaged in the guide body 71 passes through this platelet 72 and when the screw 73 has been slackened, the guide body 71 and the entire severing device 3 can be set within the frames 6a, 6b to any desired spacing from the pair of jaws 2, this spacing being fixed by tightening the screw 73.

At one of its ends the guide body 71 passes into two eyes 75 receiving a pin 76 therebetween. This pin forms a pivot shaft for an arm 77 which carries at its other, broad, end the cutter 3b and a guide pin 78 projecting to either side from this end. The back 31 of the cutter 3b and the pin 78 serve to guide the arm 77 in the frame 6b, the back 31 being rounded. The cutter 3b, and pin 78 like the cutter 3a, are also wider than the spacing of the two side walls 61. It should be noted that the distance a of the back 31 from the edge of the pin 78 is greater than the spacing of the two outer edges 62a of the two legs 62 (FIG. 4), so that no clamping of the arm 77 occurs during the movement of closing the tool; this arm should rather be only loosely guided.

The two inner frames 6a and 6b extend rearwardly from the pairs of jaws 1, 2 and cutters 3 and at the end of the leg 62 each side wall 61 widens to a bracket 63a, 63b. The brackets 63b overlapping the brackets 63a. A shaft 8 is mounted in precisely aligned holes 64 in each pair of brackets. In this manner the two frames 6a, 6b are rotatably connected to one another.

Beyond the brackets 63 the side walls 61 again become narrower. At a certain distance from these brackets 63 the side walls 61 are provided precisely registering holes 65 serving to receive a pin 9 which forms a pivot 10 for respective manipulating handles 11a, 11b. The two handles, which are substantially formed as U-sections, have at their extensions 111a, 111b a common junction designated by the reference numeral 12 and having a shaft 13 (FIGS. 1, 10). The mounting of this shaft of the peculiarities of the mode of acting of junction 12 which result therefrom will be explained in greater detail in the description of the operation of the tool.

A tension spring 14 extends from the exterior of each handle 11a, 11b to a slider 15a, 15b engaging over the frames 5a and 6a or 5b and 6b. These sliders are rigidly connected with the associated outer frame 5a or 5b respectively. At the side visible in FIGS. 1 and 2 the slider 15a has an angled portion 151a with two rectilinear abutment edges 152a, 153a. At this side of the tool the slider 15b possesses an attachment 154b with a rounded abutment edge 155b. The two sliders 15a, 15b are of exactly identical configuration, as can be seen from FIG. 7 which shows the slider 15b in its installed position. If this slider is rotated about its horizontal axis, then the slider 15a is obtained. In FIG. 7 the individual components are designated by the reference letter b. Thus both sliders can be made identically shaped, which simplifies manufacture.

The operation of this embodiment of the utensil, i.e., the stripping pliers, is as follows:

The two handles 11a, 11b are spread apart by the traction of the two tension springs 14, similarly are the two frames 5a, 6a spaced from the respective frames 5b, 6b. The two pairs of jaws 1 and 2 are located in close proximity to one another, and the conductor 4 can be inserted between the pairs of jaws 1, 2 and cutters 3.

When now the two handles 11a, 11b are singlehandedly compressed, then they swing about the pivots 10 and the common junction 12 simultaneously travels toward the line joining the two pivots 10. Since the distance d (FIG. 1) of the junction 12 from the pivot 10 initially remains constant (the shaft 13 initially acts in the manner of a non-resilient joint) it follows that the two pivots 10 must move apart. Thus the two ends of the frames 6a, 6b articulated thereto must also move apart. But since these frames are rotatably interconnected via the shaft 8 their other ends carrying the jaws and the cutters must approach one another. The tool thus comes closer to the position shown in FIG. 2.

As is apparent from FIG. 1 the two cutters 3a, 3b are nearest to one another. During the approach their cutting edges 300a, 300b (FIG. 5) therefore meet first and cut off an end portion 4a of the conduct 4, which can drop out downwardly. Upon further compression of the handles 11a, 11b the still adjacent jaws 1a, 2a also finally approach the jaws 1b, 2b. The pair of jaws 1 finally clamps the conductor 4 therebetween so that the insulation 4d is squeezed, whereupon the edges 200a, 200b (FIG. 3a) score the squeezed insulation of the conductor (FIG. 3b). These events occur prior to the junction 12 reaching the straight line between the two pivots 10 of the handles 11. It can readily be understood that if the shaft 13 of the junction were rigidly mounted further compression of the handles would either be made impossible, because of the presence of the conductor 4, or, with exertion of sufficient force, the pairs of jaws 1 and 2 (but mainly the pair of jaws 2) would then sever the conductor.

As is apparent from FIG. 10, however, this is not the case, since the shaft 13 has in fact a resilient bearing which responds when a resistance becomes effective between any of the pairs of jaws 1, 2 or 3. This bearing has a resilient body 121 surrounding the shaft 13 and outwardly contacting a bushing 122 the two ends of which are supported by two discs 123. These discs are mounted in the handle 11a and, as can clearly be seen in FIG. 10, surround the shaft 13 with considerable clearance. When a resistance becomes effective between the jaws, then the handles 11a, 11b telescope, whereby the resilient body 121 is unilaterally (in its upper half in FIG. 10) compressed. With respect to FIG. 1 this represents a reduction of the distances d of the junction 12 from the pivots. The handles can, therefore, be further compressed and the junction 12 can travel further toward the left (FIG. 1).

The events occur for the first time when the end portion 4a is being severed. As soon as this portion has been severed the pressure on the body 121 ceases. The body 121 again moves the two handles 11a, 11b apart which, via pivots 10 and 8, results in the jaws of each pair 1 and 2 abruptly approaching each other and thus initiating the squeezing process (pair of jaws 1) and the notching process (pair of jaws 2).

The softer is the material of the body 121, the weaker is the force exerted by the jaws 1a, 1b on the conductor 4. It thus becomes possible to determine the compressive force by selecting this material (generally rubber) according to requirement. It is also possible to give the body 121 and elliptic outer surface, to secure it to the shaft 13 and to so turn it by means of a handwheel 124 that the thinner or the thicker wall of the body is compressed, according to requirement. Alternatively an eccentric positioning of the body on the shaft 13 is practicable. These measures enable the compressive force of the jaws 1 to be controlled. For this purpose the handwheel 124 may be provided with a scale 125 (FIG. 9). The embodiment of the junction 12 according to FIG. 10 may, of course, also be provided in a tool according to FIG. 1.

The further pivoting of the handles 11 made possible by the mutually resilient mounting thereof now results in the abutment edge 112 finally contacting the abutment edge 152a of the slider 15a and likewise the identical edges, not visible in FIGS. 1 and 2, of the same handle contacting the abutment edge 152b (FIG. 7). After this contact the two abutment edges 112 push the two sliders 15a, 15b ahead. In order to avoid a one-sided thrust and thus prevent the sliders twisting, the abutment edges 153a, 153b, push the rounded off abutment edges 155b and 155a ahead. Since the sliders are rigidly connected to the outer frames 5a, 5b the latter also slide forward within the guide means formed by the legs 62 of the inner frames 6a, 6b; the pair of jaws 1 moves away from the pair of jaws 2, as can be seen in FIG. 2. In so doing the jaws 1 entrain the conductor 4. The insulation 4b (FIG. 3) of the residual conductor portion cannot follow this movement, because of the edges 200, and the conductor 4 with the insulation 4d entrained by the pair of jaws 1 is thus torn off the insulation 4b. The bars conductor core 4c is pulled out of the insulation 4b.

As the handles 11 yet further approach each other the junction 12 passes beyond the straight line between the two pivots 10 and again moves away from the former and therefore the two pivots 10 again come closer to each other. It follows from the preceding that the frame 5a must move away from the frame 5b. The jaws 1 and 2 therefore again open slightly and release the conductor 4. The conductor can be withdrawn and the already separated insulation 4b can be manually removed; the conductor 4 has been stripped. When lengths of 10mm and shorter are stripped the insulation 4b is removed automatically by the relative movement of the jaws 1 and 2.

Note that the length of the stripped conductor portion, i.e., the length of bare conductor core 4c, depends only on the spacing of the pair of cutters 3 from the pair of jaws 2. Since the pair of cutters is adjustably mounted any desired conductor length can, within certain limits, be stripped.

When the handles 11 are released the tension springs 14 which had been tensioned throughout the process, return the stripping pliers to the original position of FIG. 1.

FIG. 9 shows stripping pliers wherein the handle 11b has been omitted and the handle 11a is replaced by a kind of pistol grip 11'a, while a hydraulic or pneumatic piston and cylinder unit 16 acts on the junction 12 and causes its displacement relative to the pivots 10. The sliders 15 shown in FIG. 1 are here reduced to mere guide yokes 15'a and 15'b instead, the frames 5'a and 5'b are rearwardly extended, each side wall 51'a of the frame 5'a having an end 52'a of increased width. The attachments 111 of the handles 11 of FIG. 1 are reduced to two short arms 111'a, 111'b which are mounted in the junction 12 in identical manner as is shown in FIG. 10. The piston of the unit 16 acts directly on the shaft 13.

These pliers operate in the same manner as those of FIG. 1. Alternatively the handle 11b of FIGS. 1 and 2 could be retained and the piston and cylinder unit could act thereon, for which purpose it would have to be turned 90° relative to the illustrated position.

FIGS. 11 to 13 show a further embodiment of the stripping tool which is primarily suitable for very thin wires as are used in the electronics industry. The pairs of jaws 1, 2 and the severing device 3 are again present, the latter in a slightly modified form. But in constrast to the stripping pliers the first or outer frames 5'a, 5'b are immobile and moreover so thin that they can be resiliently bent toward one another. The frames 5''a, 5''b are anchored in a handle 11', and the second pair of frames 6'a 6'b are also resilient and joined together to effectively form a single frame, frames 6''a, 6''b carrying a notching jaw 2a, 2b respectively. This single frame 6'' is secured to a pin 17 which is axially displaceable in a bore 18 in the handle 11 and when not in use the pin 17 is urged so far outwardly, by a compression spring 19 disposed in the bore 18, that the pair of jaws 2 contacts the pair of jaws 1.

In this embodiment the severing device 3 is guided at the outer side of the frames 5'' and 6'', whereby simultaneously the movable frame 6'' is centered with respect to the pair of frames 5''. The guide body 71' retaining the cutter 3a has two downwardly projecting flaps 710' which encompass the edges of the frames 5''b and 6''b and through which passes a set screw 73' which, when tightened, urges these flaps against the frame 6'', without the flaps contacting frame 5''a (and only thereagainst). The frame 5''a is of somewhat narrower design so as not to hamper displacement of the frame 6''. Instead of two eyes 75 only an attachment 75' for the pin 76 is present, which pin 76 serves as pivot for two plates 77' arranged laterally of the frames 5'' and 6'' and receiving the upper cutter 3b. The two plates 77' are connected to one another by the cutter 3b, the guide pin 78 and by a grooved finger plate 79. A similar plate 79 is also provided on the guide body 71'. This embodiment of the tool, which is called stripping tweezers or pincers, is operated in such manner that two fingers of one hand are placed on the finger plate 79 and the frames 5''a and 5''b are urged toward each other. Here too the cutters 3a, 3b first cut off a piece 4a of the conductor 4 before the pairs of jaws 1 and 2 meet. The severing device 3 is then pulled back by the fingers, which still rest on the plates 79, and thereby the frame 6'' with the jaws 2 is also pulled back, whereby the notched insulation 4b is stripped off the conductor and the bare conductor core 4c appears. Upon release, the spring 19 returns the frame 6'' to the original position and at the same time the pairs of jaws 1, 2 and the severing device 3 open as a result of the resilience of the frame 5''.

I claim:

1. A wire stripper comprising, in combination:
   a. a first pair of elongated frames, having ends pivotable towards and away from one another;
   b. a first pair of jaws respectively mounted on the ends of said first frames for constraining an insulated wire therebetween;
   c. a second pair of elongated frames having ends pivotable towards and away from one another;
   d. a second pair of jaws respectively mounted on the ends of said second frames for making knotches in the insulation of the wire;
   e. a severing device actuated by one of said pair of frames for severing the end of the wire, the second pair of jaws being located between the first pair of jaws and the severing device;
   f. means for adjusting the spacing of the severing device from the second pair of jaws; and
   g. means for increasing the spacing between the jaws of the first pair and the jaws of the second pair, during closure of the two pairs of jaws.

2. A wire stripper according to claim 1, wherein each of the frames comprises two longitudinally extending spaced apart side plates and a transverse portion therebetween which carries a respective jaw wherein each of the frames of the first pair is slidably mounted on a respective one of the frames of the second pair.

3. A wire stripper according to claim 2, and further comprising a shaft; two operating components pivotally mounted on said shaft; pivoting means for pivotally mounting the second pair of frames with respect to one another at a location between their ends; a resilient radially peripheral portion of said shaft, each of the end portions of the second pair of frames remote from the jaws being pivotally connected to a respective one of said operating components.

4. A wire stripper according to claim 3, and further comprising an adjusting knob wherein the resilient shaft is eccentric and the adjusting knob is mounted thereon.

5. A wire stripper according to claim 3 and further comprising a pair of jaws for the severing device; a mounting plate for the first of the severing device jaws, releasably engaging means on the mounting plate for engaging one of the second pair of frames without obstructing the movement of the corresponding first frame; transversely extending portions for the severing device adapted to be entrained by the second pair of frames; and further pivotal mounting means for the first and second severing device jaws located between the second pair of frames, whereby movement of the second frames towards one another causes movement of the severing device jaws towards one another.

6. A wire stripper according to claim 5, wherein at least one of the said operating components is adapted to engage the ends of the first pair of frames remote from their jaws during pivoting of the operating components so that, during continuation of the pivoting movement, the first pair of jaws are shifted in the longitudinal direction and their spacing from the second pair of jaws is increased.

7. A wire stripper according to claim 6 and further comprising two springs wherein each of the first pair of frames is connected to a respective one of the operating components by a separate one of said springs.

8. A wire stripper according to claim 3 wherein the operating components are in the form of handles.

9. A wire stripper according to claim 3 and further comprising a pistol grip and a pressure fluid operated piston and cylinder arrangement, the piston of which is connected to the shaft so that operation of the piston displaces the shaft substantially in the said longitudinal direction.

10. A wire stripper according to claim 9, and further comprising means for connecting the piston to one of the first pair of frames so that the piston directly displaces the said one frame and this said one frame is adapted to entrain the other frame of the said pair.

11. A wire stripper according to claim 3, wherein when in its unactuated condition the shaft is located spaced from a line connecting the two pivoting axes between the second pair of frames and the operating components and wherein during actuation, the resilient shaft crosses this line, at this instant the two axes of pivoting being at maximum mutual spacing.

12. A wire stripper according to claim 1 and further comprising a handle having a longitudinal bore therein; a pin adapted for sliding movement in said bore wherein both pairs of frames are resiliently deformable, the ends of the first pair of frames remote from the jaws being anchored to the handle, the second pair of frames are located between the first pair of frames, carrying the severing device and are rigidly secured to the pin and wherein the second pair of frames and severing device are adapted for longitudinal movement relative to the first pair of frames.

13. A wire stripper according to claim 12 and further comprising two cutters and respective holder portions for the severing device; relatively pivotable mounting means for said holder portions; mounting means for adjustably mounting one of said holder portions on one of the second pair of frames, wherein the other said holder portion is adapted to entrain the other frame of the second pair of frames so that, during closure of the severing cutters, the second pair of frames also close, the two said portions being shaped so that they do not contact the first pair of frames.

* * * * *